(12) United States Patent
Cossairt (10) Patent No.: US 8,345,087 B2
(45) Date of Patent: Jan. 1, 2013

(54) IMAGE ENHANCEMENT FOR THREE-DIMENSIONAL DISPLAYS

(75) Inventor: Oliver S. Cossairt, New York, NY (US)

(73) Assignee: Parellel Consulting Limited Liability Company, Dover, DE (US)

(*) Notice: Subject to any disclaimer, the term of this patent is extended or adjusted under 35 U.S.C. 154(b) by 1710 days.

(21) Appl. No.: 11/679,539

(22) Filed: Feb. 27, 2007

(65) Prior Publication Data

US 2007/0201133 A1 Aug. 30, 2007

Related U.S. Application Data

(60) Provisional application No. 60/777,043, filed on Feb. 27, 2006.

(51) Int. Cl.
*H04N 7/18* (2006.01)

(52) U.S. Cl. ............................. 348/51; 349/62
(58) Field of Classification Search .................. 348/51, 348/54, 56; 349/15, 62
See application file for complete search history.

(56) References Cited

U.S. PATENT DOCUMENTS

| | | | |
|---|---|---|---|
| 725,567 A | 4/1903 | Ives | |
| 1,128,979 A | 2/1915 | Hess | |
| 3,409,351 A | 11/1968 | Winnek | |
| 5,245,191 A * | 9/1993 | Barber et al. | 250/363.04 |
| 6,061,179 A * | 5/2000 | Inoguchi et al. | 359/464 |
| 6,064,424 A | 5/2000 | Van Berkel et al. | |
| 6,118,584 A | 9/2000 | Van Berkel et al. | |
| 6,337,721 B1 * | 1/2002 | Hamagishi et al. | 349/15 |
| 6,459,532 B1 * | 10/2002 | Montgomery et al. | 359/462 |
| 6,606,135 B2 * | 8/2003 | Nakanishi et al. | 349/95 |
| 6,900,870 B2 * | 5/2005 | Song | 349/130 |
| 7,066,599 B2 * | 6/2006 | Hattori et al. | 353/7 |
| 7,142,283 B2 * | 11/2006 | Shiozawa | 355/53 |
| 7,173,251 B2 * | 2/2007 | Fraser et al. | 250/370.11 |
| 7,468,781 B2 * | 12/2008 | Shiozawa | 355/67 |
| 7,532,225 B2 * | 5/2009 | Fukushima et al. | 345/696 |
| 7,619,815 B2 * | 11/2009 | Nam et al. | 359/464 |
| 7,787,008 B2 * | 8/2010 | Fukushima et al. | 348/51 |
| 7,800,725 B2 * | 9/2010 | Na et al. | 349/129 |
| 2002/0039157 A1 * | 4/2002 | Nakanishi et al. | 349/95 |
| 2005/0151961 A1 * | 7/2005 | McGraw et al. | 356/121 |
| 2006/0164528 A1 * | 7/2006 | Harrold et al. | 348/276 |

OTHER PUBLICATIONS

C. Van Berkel and J. A. Clarke, "Characterisation and Optimisation of 3D-LCD Module Design," in Stereoscopic Displays and Virtual Reality Systems IV, eds. S. S. Fisher, J. O. Merritt, and M. T. Bolas, Proc. SPIE 3012, 179-186 (May 1997).
F. E. Ives, "A Novel Stereogram," Journal of the Franklin Institute, 153, 2 pages, 255-256 (1902).
W. L. IJzerman, S. T. Zwart, T. Dekker, "Design of 2D/3D Switchable Displays," in SID 05 Digest, Philips Research Laboratories, Professor Holstlaan 4, 5656AA Eindhoven, the Netherlands pp. 98-101.
L. Lipton and M. Feldman, "A new autostereoscopic display technique: The Synthagram", in Stereoscopic Displays and Virtual Reality Systems IX, Proceedings of the SPIE, vol. 4660, pp. 229-235, San Jose, 2002.

* cited by examiner

*Primary Examiner* — Moustafa M Meky
(74) *Attorney, Agent, or Firm* — Turocy & Watson, LLP

(57) ABSTRACT

A three-dimensional (3D) display apparatus includes an image generation subsystem (IGS) for generating at least one two-dimensional (2D) image and providing filtered rays derived from the at least one 2D image to an optical element for modulating the filtered rays and producing a 3D image, wherein the filtered rays comprise limited overlap of pixel information. A method and a computer program product for generating 3D images are provided.

15 Claims, 8 Drawing Sheets

Fig. 1

--PRIOR ART--

Fig. 2A

--PRIOR ART--

Fig. 2B

Top view

--PRIOR ART--

Fig. 2C

Side view

--PRIOR ART--

Fig. 3A

--PRIOR ART--

Fig. 3B

--PRIOR ART--

Fig. 3C

--PRIOR ART--

Fig. 3D

--PRIOR ART--

Fig. 4A

--PRIOR ART--

Fig. 4B

--PRIOR ART--

Fig. 4C

--PRIOR ART--

IMAGE ENHANCEMENT FOR THREE-DIMENSIONAL DISPLAYS

CROSS REFERENCE TO RELATED APPLICATIONS

This application is filed under 37 CFR §1.53(b) and claims priority under 35 U.S.C. 119(e) to prior U.S. Provisional Patent Application No. 60/777,043, filed, Feb. 27, 2006, the entire disclosure of which is incorporated herein by reference in its entirety.

STATEMENT REGARDING FEDERALLY SPONSORED RESEARCH & DEVELOPMENT

The U.S. Government may have certain rights in this invention pursuant to Grant No. 70NANB3H3028 awarded by the National Institute of Standards and Technology (NIST).

BACKGROUND OF INVENTION

1. Field of the Invention

The teachings herein relate to three-dimensional (3D) displays and, in particular, to image enhancement for a 3D display.

2. Description of the Related Art

Optical elements that use spatial de-multiplexing have been used to create 3D images for nearly a century. Exemplary optical elements include narrow vertical slits or lenticular sheets.

Figure 1:
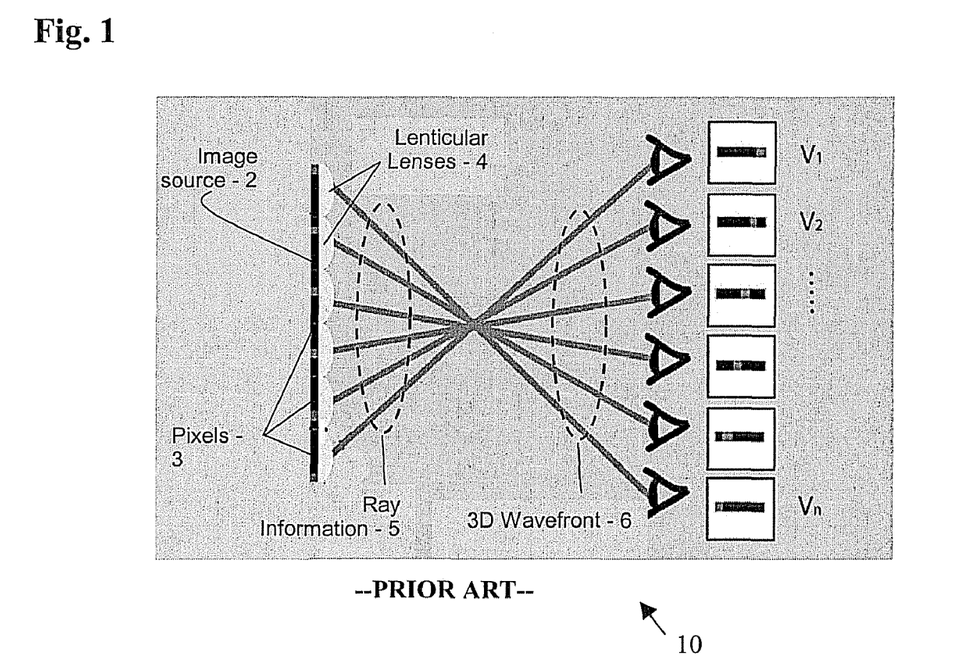
FIG. 1 is a prior art lenticular display assembly for creating a 3D image.

The method of spatial de-multiplexing by use of lenticular sheets (i.e., arrays) generates a 3D image from a two-dimensional (2D) image. The resulting 3D image has a lower resolution than that of the 2D image. Reference may be had to FIG. 1.

In a prior art display apparatus 10 depicted in FIG. 1, an image source 2 provides a 2D array of pixels 3. The 2D array of pixels 3 provides information to a single array of lenticular lenses 4 (in some embodiments, the array of lenses is referred to as a "lenticular lens"). The lenticular lenses 4 optically manipulate light from pixels 3 to generate ray information 5 that forms a 3D image wavefront 6.

The 3D wavefront 6 is produced by aligning each lenticule of the array of lenticular lenses 4 so that a field of view for the lenticule covers several pixels in the array of pixels 3. Each pixel that is within the field of view is converted to ray information 5 by the refractive properties of the lens. Thus, each lenticule becomes an emitter with angularly varying intensity components. The geometrical properties of the 3D wavefront 6 can consequently be represented by correct parameterization of spatially and angularly varying components of the ray information 5. In general, the more pixels 3 that can be associated with the lenticular lenses 4, the more accurate the 3D image wavefront becomes. Thus, in the prior art, it is desirable to have a very high resolution image source 2, since this will allow one to produce a 3D image with modest spatial resolution and good ray sampling. However, such display apparatus 10 are not without drawbacks.

Figure 2A:
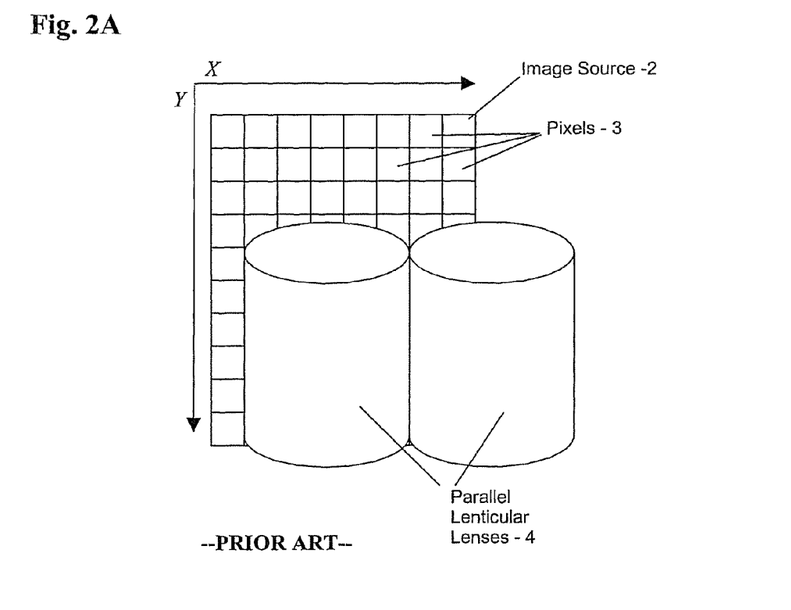
FIG. 2A, FIG. 2B and FIG. 2C, collectively referred to herein as FIG. 2, depict aspects of a prior art display apparatus using cylindrical lenses where resolution is sacrificed in a horizontal (x-axis) direction.
Figure 2B:
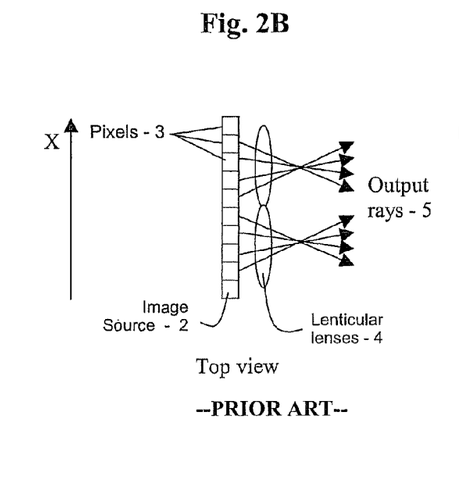
Figure 2C:
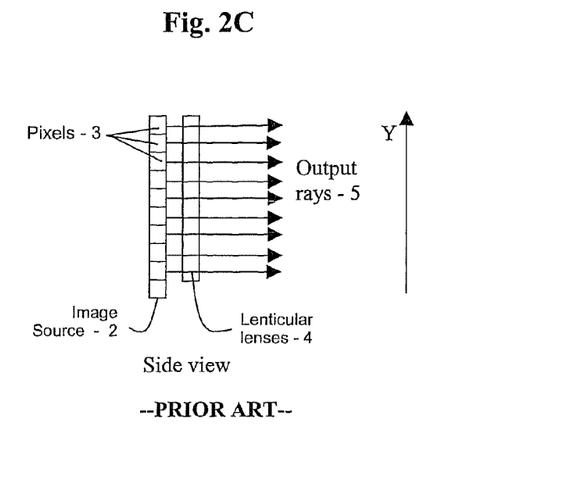

For example, such display apparatus 10 typically use cylindrical lens arrays as the lenticular lenses 4. The use of cylindrical lens arrays creates horizontal-parallax-only (HPO) imagery. One particular drawback of using cylindrical lens arrays is that in the common configuration, horizontal resolution and vertical resolution of the image source 2 are not equally reduced by the lenticular lenses, resulting in a 3D image 6 with unequal horizontal and vertical resolution. Reference may be had to FIG. 2.

In FIG. 2A, a portion of the prior art display apparatus is depicted. This illustration shows cylindrical lenticular lenses 4 which are aligned with the image source 2. The alignment of the lenticular lenses 4 is consistent with an orientation of the pixels 3 in the image source 2. That is, as shown in this illustration, the lenticular lenses 4 share a direction (a y-axis direction) with the pixels 3 included in the array. The orientation of the lenticular lenses 4 are further described in FIGS. 2B and 2C. In FIG. 2B, the lenticular lenses 4 are shown according to the x-axis (from the top), and in FIG. 2C, the lenticular lenses 4 are shown according to the y-axis (from the side). As shown in FIGS. 2B and 2C, the image source 2 produces output rays 5 which are focused by the lenticular lenses 4. Whereas the reconstructed 3D image 6 has one reconstructed vertical pixel for each input pixel 3, the reconstructed x resolution is degraded in this illustration by a factor of approximately ⅕.

In FIG. 2, the lenticular lenses 4 are shown as generally cylindrical lenses. As the cylindrical lenses do not have any optical power along their height (the y-axis), they cannot convert pixel information into ray information along this axis (see FIG. 2C). In a typical 3D display, this type of arrangement sacrifices quality of the 3D image along one axis.

Figure 3A:
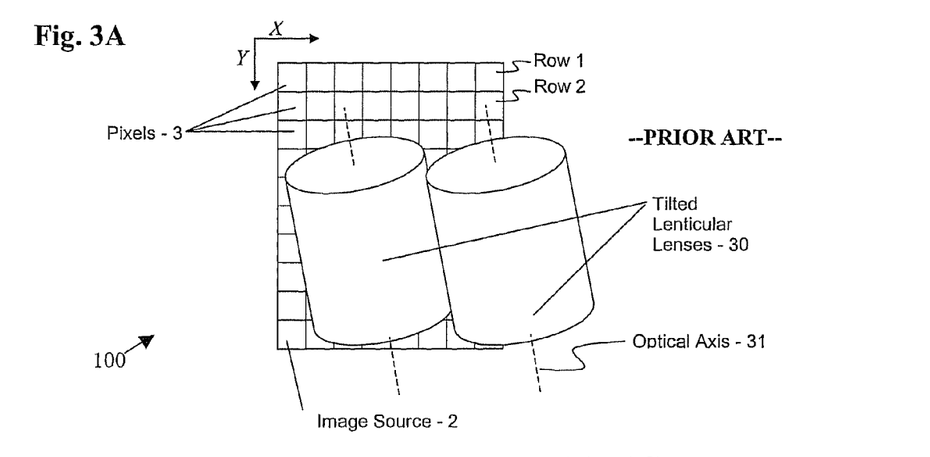
FIG. 3A, FIG. 3B, FIG. 3C and FIG. 3D, collectively referred to herein as FIG. 3, depicts aspects of a prior art display apparatus using tilted lenticular lenses.

In FIG. 3A, an image source 2 provides an array of pixels 3. As shown in the illustration, the pixels 3 are distributed along an x-axis and a y-axis. As is known in the prior art, lenticular lenses are used to provide for focusing of output rays from the image source 2. In this example, the lenticular lenses are tilted lenticular lenses 30.

Figure 3B:
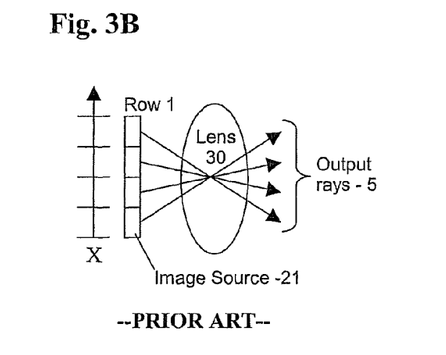
Figure 3C:
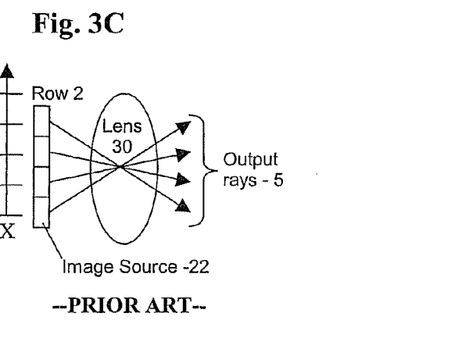
Figure 3D:
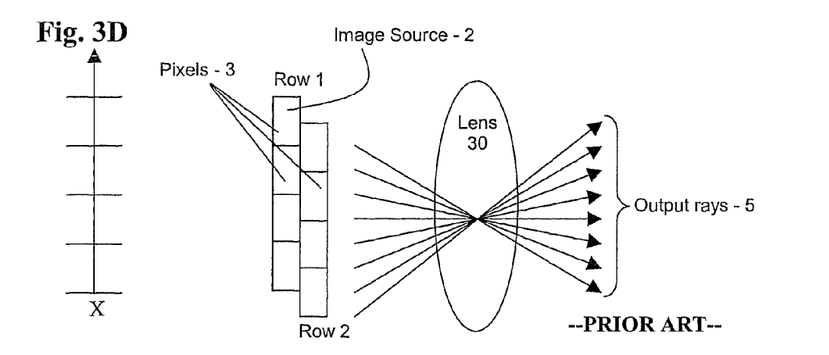

In this example, the tilted lenticular lenses 30 are tipped slightly with respect to the pixels 3 of the image source 2. This provides an effect such that a respective center of each pixel 3 for each row of pixels 3 is offset slightly from an optical axis 31 of each tilted lenticular lens 30. Since a direction for an output ray 5 from each pixel 3 is proportional to offset from the optical axis 31, adjacent pixels 3 along a column are output in different ray directions. Thus, vertical resolution may be controlled along with the horizontal resolution to achieve greater ray sampling. That is, in practice, an observer will see a multiple of the number of rays (for example, 8 instead of 4) as compared to the system using parallel lenticular lenses. This is shown in FIG. 3D. Although this technique provides for equalization of resolution in the x-axis and the y-axis, output rays 5 from pixels 3 of adjacent rows overlap one another, and thus produce the equivalent of a low-pass filter. Reference may be had to FIGS. 3B, 3C and 3D as well as FIG. 4.

In FIG. 3B, a first row of pixels in the image source 2 is shown. In FIG. 3C, a second row of pixels in the image source 2 is shown. The second row is slightly offset from the first row (that is, effectively offset from the first row), due to the tilting of the lenticular lens 30. Output rays 5 from the combination are shown in FIG. 3D. The x-axis depicted in FIG. 3 shows an alignment of pixels 3 in each row with the pixels in the first row (Row 1).

Various forms of focusing lenses are used. In this example, the tilted lenticular lenses 30 having a desired orientation are generally referred to as "tilted" or "clocked." The parallel lenticular lenses 4 (which have no angular deflection from a column of pixels) are generally referred to as "parallel" (with reference to a pixel axis) and by other similar terms. It is recognized that lenticular lenses may take on various forms and are not limited to tilted, parallel, cylindrical, elliptical or by other shapes. Each lenticule may be a singlet, doublet, or other lens type.

Figures 4A, 4B, 4C:
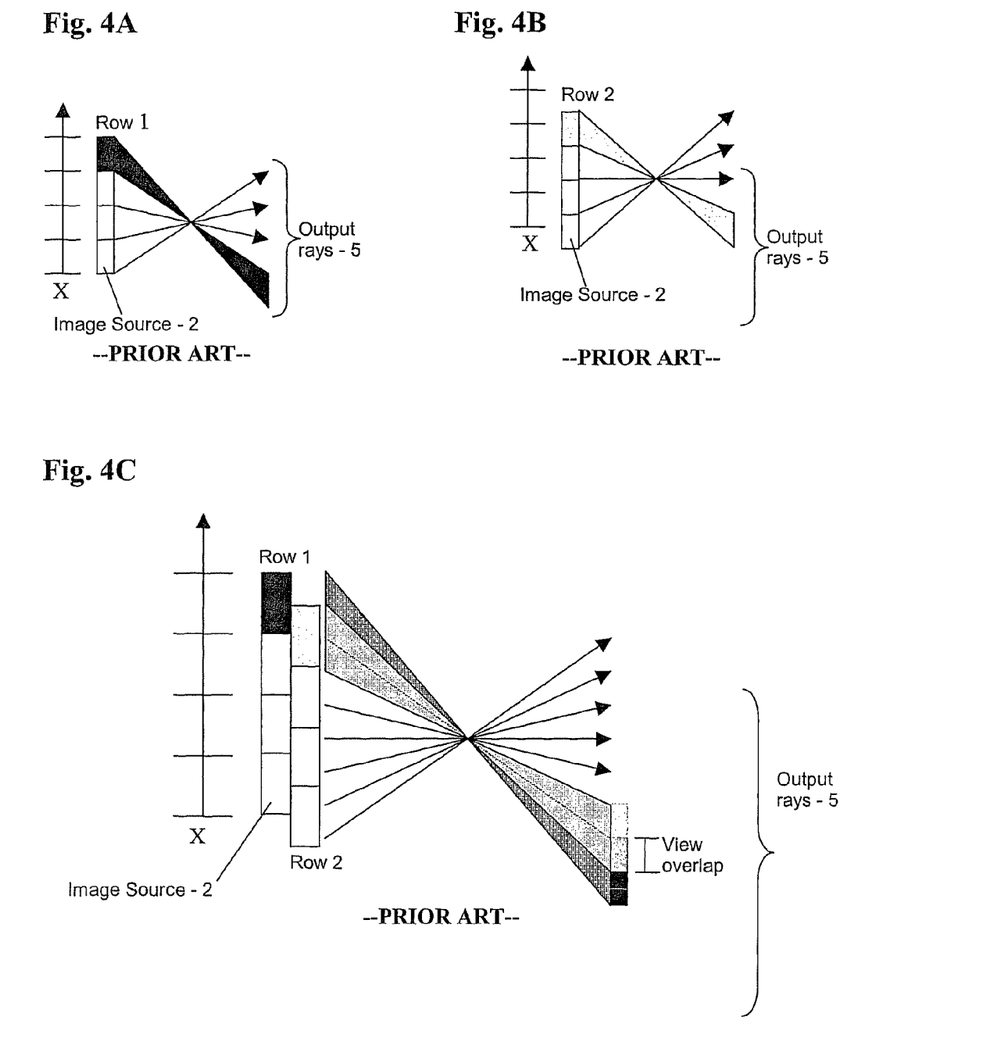
FIG. 4A, FIG. 4B and FIG. 4C, collectively referred to herein as FIG. 4, depict aspects of pixel overlap that results from use of a tilted lenticular lens.

FIG. 4 shows how providing the tilted lenticular lenses 30 (relative to a prior art cylindrical lenticular lens 4) provides a desired view resolution. Though centers of pixels 3 for pixels 3 in adjacent rows are horizontally offset, the horizontal field of view for these pixels overlap, effectively low-pass filtering the output rays 5 and producing a generally undesirable effect. This results in "view overlap" (interview crosstalk), which has a side effect of limiting the degree of depth in the reconstructed 3D image 6. The resulting view overlap between two pixels in adjacent rows is shown in FIG. 4C.

What are needed are methods and apparatus, such as those disclosed herein, for providing improved resolution in a 3D image, where a vertical resolution and a horizontal resolution (along both axes of a 2D image source) appear to be about equal, and where view overlap is minimized.

BRIEF DESCRIPTION OF THE INVENTION

Disclosed is a three-dimensional (3D) display apparatus, the apparatus including: an image generation subsystem (IGS) for generating at least one two-dimensional (2D) image and providing filtered rays derived from the at least one 2D image to an optical element for modulating the filtered rays and producing a 3D image, wherein the filtered rays comprise limited overlap of pixel information.

Also disclosed is a method for producing a three dimensional (3D) image, the method including: providing a display apparatus including an image generation subsystem (IGS) for generating at least one two-dimensional (2D) image and providing filtered rays derived from the at least one 2D image to an optical element for modulating the filtered rays and producing the 3D image, wherein the filtered rays comprise limited overlap of pixel information; and modulating the filtered rays for producing the 3D image.

Further disclosed is a computer program product stored on machine readable media, the product including instructions for producing a three dimensional (3D) image by executing instructions including: operating a 3D display apparatus including an image generation subsystem (IGS) for generating at least one two-dimensional (2D) image and providing filtered rays derived from the at least one 2D image to an optical element for modulating the filtered rays and producing the 3D image, wherein the filtered rays comprise limited overlap of pixel information; and producing the 3D image.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Disclosed is a three-dimensional (3D) display apparatus that provides for images produced from at least one two-dimensional (2D) image. The 3D display provides generally uniform resolution images. Since it is typically desirable to have equal horizontal and vertical resolutions, a technique for equalizing resolution equally along both axes of the 2D image is provided. Since it is typically desirable to minimize view overlap in reconstructed 3D imagery, a technique for minimizing view overlap is provided.

Figure 5:
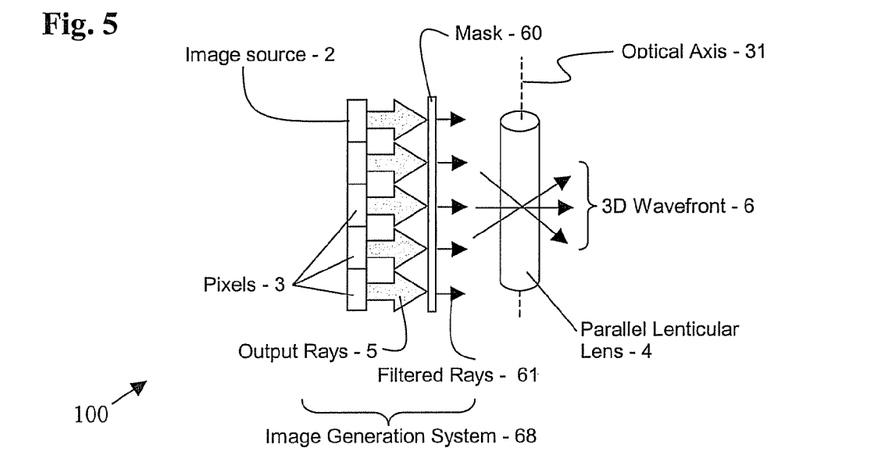
FIG. 5 depicts an embodiment of a image generation system according to the teachings herein.

Referring now to FIG. 5, there are shown aspects of a 3D display apparatus 100 according to the teachings herein. The 3D display 100 includes an image generation subsystem 68 (IGS). Typically, the IGS 68 includes an image source 2 (as an example, an LCD panel) and a mask 60. In general, and as in the prior art, the image source 2 produces an image from a plurality of pixels 3. The pixels 3 are arranged, for convention, along an x-axis and a y-axis (as an example, refer to FIG. 3A). Included as a part of the IGS 68 is a mask 60.

The mask 60 receives output rays 5 from the image source 2 and filters the output rays 5. Thus, it may be considered (at least for convention herein) that the mask 60 produces filtered rays 61. The mask 60 is typically adapted to receiving output rays 5 from the image source 2 and providing filtered rays 61 useful for the optical element included in the display apparatus 100. That is, the mask 60 is typically adapted for the particular optical element (e.g., the parallel lenticular lens 4 or the tilted lenticular lens 30, or any other type of optical element included in the 3D display 100).

Figure 7A:
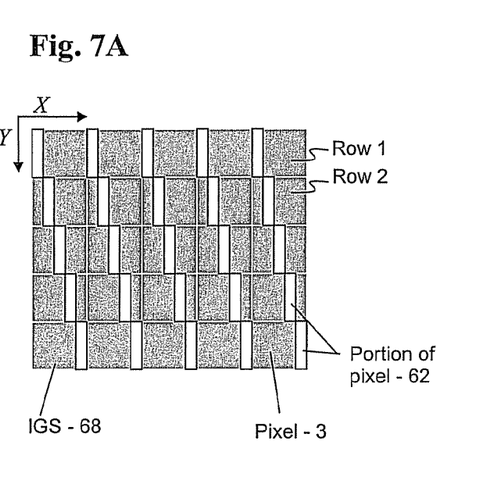
FIG. 7A and FIG. 7B, collectively referred to herein as FIG. 7, depict embodiments of ray filtering.

In an embodiment, the mask 60 is a two-dimensional barrier such as that illustrated in FIG. 7A, in which a region opaque to visible light is depicted in black, and regions transmissive to visible light are depicted in white. Each light-transmissive area (referred to as a "portion of pixel 62") has a size and shape that is a function of several factors. Exemplary factors include, without limitation, a number of ray directions reconstructed by the 3D display, a distance between adjacent lenticules (the "lenticular pitch"), and a resolution density along the x-axis and the y-axis. For example, a 3D display in a standard 3:4 ratio may have an image diagonal measuring 20" (50.8 cm), corresponding to a horizontal width of 16" (40.6 cm) and a height of 12" (30.5 cm). A 25-view 3D image with a 5×5 pattern of portion of pixels 62 and a per-view resolution of 1024 horizontal pixels×768 vertical pixels requires an image source 2 with 1,024×5=5,120 pixels horizontally by 768×5=3,840 pixels vertically. Therefore, in the horizontal direction, each pixel 3 has a pitch of 5,120 pixels/406 mm=12.6 pixels/mm. This equals a pixel width of 79 microns, and by similar calculation, a pixel height of 79 microns. In order to reconstruct 25 ray directions from a square region of 25 pixels, in this example, the filtered rays 61 are generated by diagonally staggered portions of pixels as illustrated in FIG. 7A; the width of each portion of pixel is ⅕ the width of a pixel 3, and the height of each portion of pixel is equal to the height of a pixel 3. That is, each portion of pixel 62 is approximately 15.8 microns wide and 79 microns high.

The mask 60 can be made in a variety of processes, including standard printing processes onto transparent film that is attached to a transparent carrier, glass, a diffuse surface, or a lenticular array using electrostatic or chemical adhesive means.

In other embodiments, the mask 60 includes a one dimensional barrier. The filtered rays 61 are directed to the lens array. In this example, the lens array includes an array of vertical lenticular lenses 30 in order to produce the 3D wavefront 6.

The term "filtered rays" generally refers to the ability of the 3D display 100 to provide output rays 5 in substantially separated bundles. That is, by one standard, the filtered rays 61 do not overlap, or appear to have overlap (to the unaided eye of a human observer). Thus, the production of filtered rays 61 as disclosed herein results in the 3D image that appears to have improved resolution over the prior art, and does not include blurring effects, or those effects that result from overlap of pixel information.

The quality of 2D displays 100, such as spatially-multiplexed multi-view 3D displays 100 (e.g. lenticular, parallax, barrier, etc.), is improved by, among other things, limiting the crosstalk between views. In various embodiments, limiting crosstalk between pixels 3 is accomplished by including the mask 60 or an aperture design into the 3D display 100. In some embodiments, special pixel architectures are included directly in the image source 2, obviating the need for the mask 60. Optics used in the display 100 may include a wide range of optical systems, including those in which the lenticular lenses (or other optical demultiplexing elements) are "clocked" relative to the orientation of the pixel columns in the source image 2.

The 2D image source 2 is considered to be at least a part of an "image generation subsystem" (IGS) 68. The IGS 68 may include a variety of embodiments. For example, in some embodiments, the mask 60 is included, in others the mask 60 is excluded. Exemplary and non-limiting embodiments foregoing the mask 60 include embodiments where the image source 2 provides each pixel 3 according to a pattern that is essentially provides the respective portion of pixel 62 (reference may be had to the special architectures discussed above). That is, the teachings herein provide for use of image sources 2 that are arranged for producing output rays 5 that are the equivalent of the filtered rays 61, and providing the equivalent rays directly to an optical element for the 3D display 100. Typically, commercially available image sources 2 are used.

An exemplary image source 2 includes for example, a liquid crystal display (LCD). Other types of image sources 2 include, without limitation, a cathode ray tube (CRT), a vacuum fluorescent display (VFD), a digital light processing display (DLP), a plasma display panel (PDP), a light-emitting diode (LED), an organic light-emitting diode (OLED), a surface-conduction electron-emitter display (SED), a field emission display (FED), and a liquid crystal on silicon display (LCOS), or any source which produces an image which may be projected at or near the lenticular array, such as onto an intermediate diffuse surface. Of course, one skilled in the art will recognize that certain adaptations may be called for to apply such technologies to the teachings herein.

In various embodiments, aperture arrays, masks 60 and other such components may be included in the IGS 68. More details regarding an optical mask 60 are now provided.

Some embodiments of the mask 60 include a vertical barrier. In these exemplary and non-limiting embodiments, the vertical barrier is composed of opaque and transparent lines. For a 25 view display with 400 μm lenticular lenses, the magnified DMD pixel will be 80 μm. To reduce pixel crosstalk the vertical barrier will aperture each 80 μm pixel to 25 μm. Thus the vertical barrier has a line pair width of 80 μm where the opaque line is 55 μm thick and the transparent line is 25 μm thick. The vertical barrier can be made on glass with chrome or emulsion. The glass can range in thickness from 100 μm to 3000 μm. The emulsion or chrome layer can range in thickness from 0.050 μm to 1 μm. In one example, the vertical banier is provided by Advance Reproduction (Andover, Mass.) and is made on film with a total thickness of 177.902 μm. The emulsion thickness is 1 μm. The vertical barrier can either be vertical to the film's edge and then the lenticular screen is tilted at a 11.3 degree angle (from vertical) which corresponds to a ⅕th slope allowing for 25 separate views in the horizontal direction. The alternative is to etch or print the vertical lines at the 11.3 degree angle while keeping the lenticular screen square to the viewing plane (i.e., vertical). To align a tilted vertically striped barrier (i.e., mask 60) with precision on the lenticular screen usually calls for precision alignment marks (100 μm or larger) along the border of the etched film or glass. These marks can be aligned carefully with markings on the lenticular screen.

Various embodiments of optics may be used, for example, to equalize resolution along the x-axis and the y-axis of the image source 2. As used herein, tilted lenticular lenses 30 are an embodiment of such optics, as a parallel lenticular lenses 4. Other types of optics may be used to provide the desired effect. Accordingly, use of the term "tilted lenticular lenses" and "parallel lenticular lenses" are merely exemplary and are not limiting of the teachings herein.

Figure 6A:
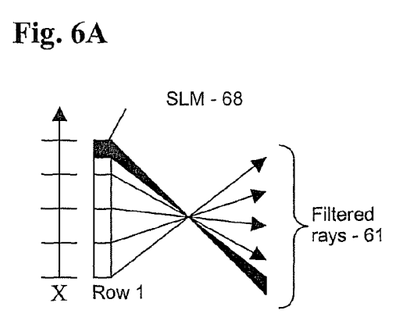
FIG. 6A, FIG. 6B and FIG. 6C, collectively referred to herein as FIG. 6, depict aspects of a 3D image that does not induce pixel overlap while using a parallel lenticular lens.
Figure 6B:
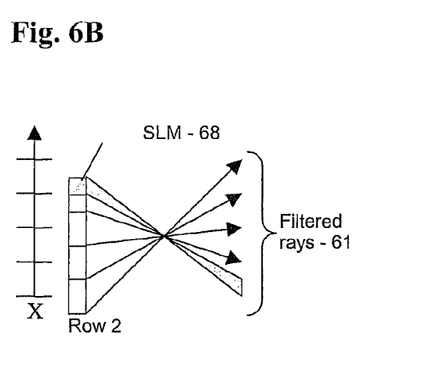

A result of these various embodiments is that pixel data does not overlap in an output 3D image. Reference may be had to FIG. 6. In FIG. 6A and FIG. 6B, the IGS 68 provides portions of respective pixels 3. The output rays 5 that result do not include any ray overlap, as shown in FIG. 6C.

Figure 6C:
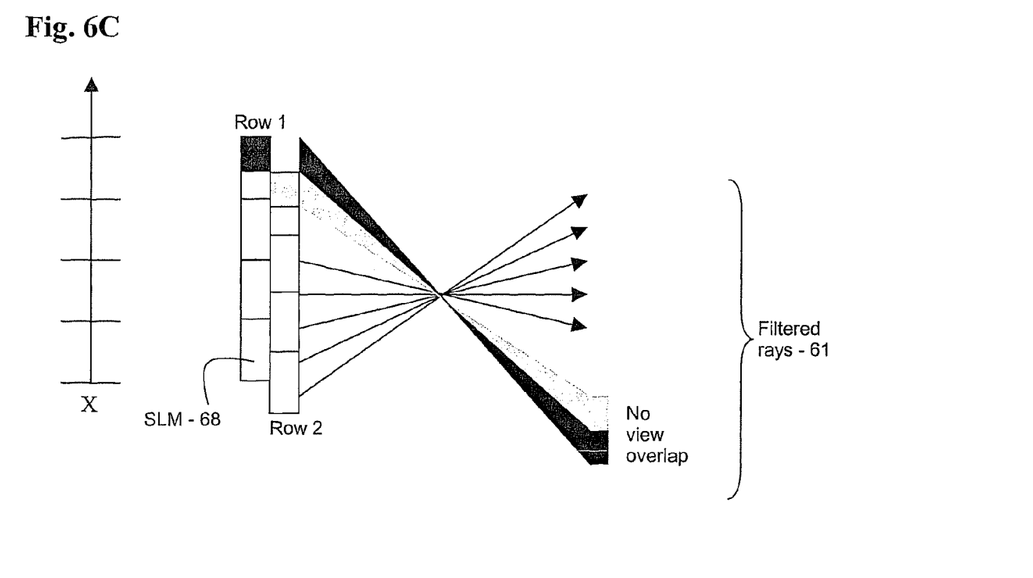

When the pixel structure referred to in FIG. 6 is used in conjunction with a parallel lens array 4 (i.e., one that is vertically aligned to a pixel grid of the image source 2), better ray sampling results than by use of the tilted lenticular lens 30 alone. Thus, more realistic 3D imagery can be displayed.

Figure 7B:
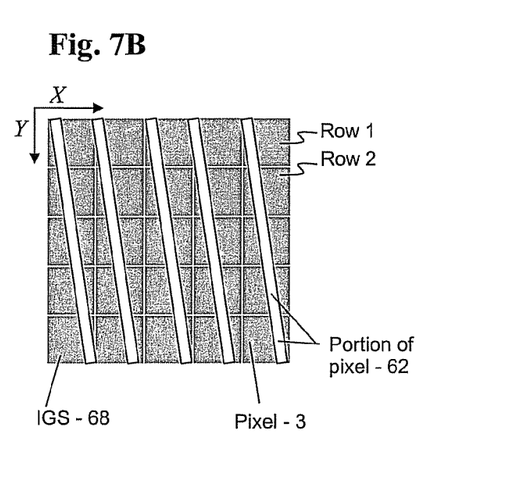

Referring now to FIG. 7A and FIG. 7B, two embodiments of the IGS 68 are shown. In FIG. 7, desired pixel structures for enhanced 3D image quality and equal vertical and horizontal resolution reduction are provided. In each of the patterns depicted in FIG. 7, a grid of five (5) pixels by five (5) pixels is masked to produce a pattern of twenty five (25) white rectangles as shown. For each pixel 3, the white rectangles depicted correlates to a portion of the pixel 62. By employing a technique that includes use of the mask 60, the grid of pixels may be transformed to a single pixel 3 in the 3D wavefront 6. Thus, horizontal resolution and vertical resolution are equalized and ray overlap is avoided. FIG. 7B depicts a desired pixel structure, which corresponds to a degree of tilt in the tilted lenticular lens 30. FIG. 7A shows a near approximation of FIG. 7B, which is produced by overlaying a 1D barrier pattern over a regular pixel grid.

Figure 8:
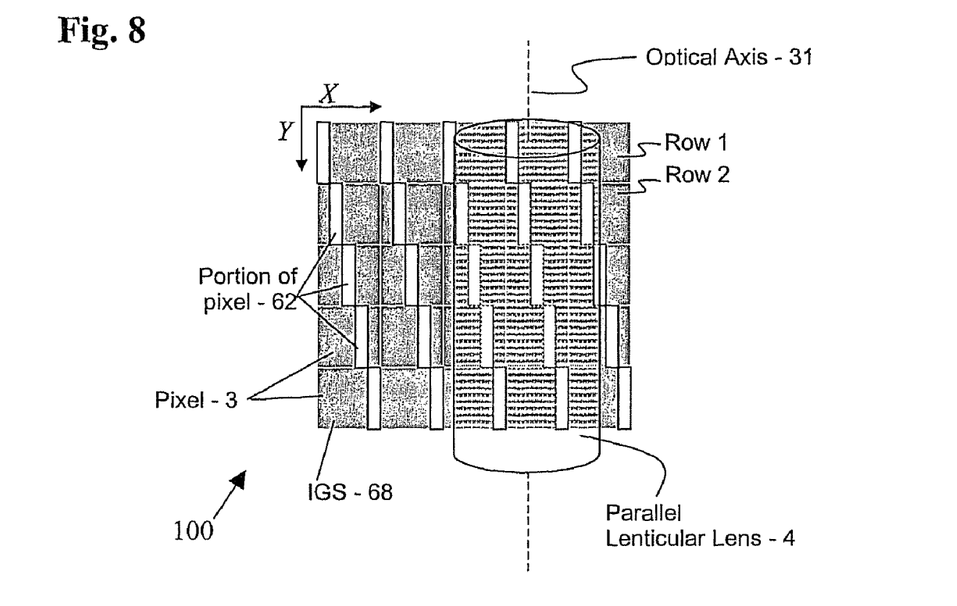
FIG. 8 depicts an embodiment of ray filtering in conjunction with a parallel lenticular lens.

In FIG. 8, the pixel structure of the IGS 68 allows for greater amount of rays to be modulated than embodiments of 3D displays using either one of parallel lenticular lenses 4 and tilted lenticular lenses 30 with regular grid pixel structures.

As used herein, "modulating" refers to one or more of: refracting, transmitting, aperturing, reflecting, diffusing, diffracting, or performing any other optical manipulation.

Figure 9:
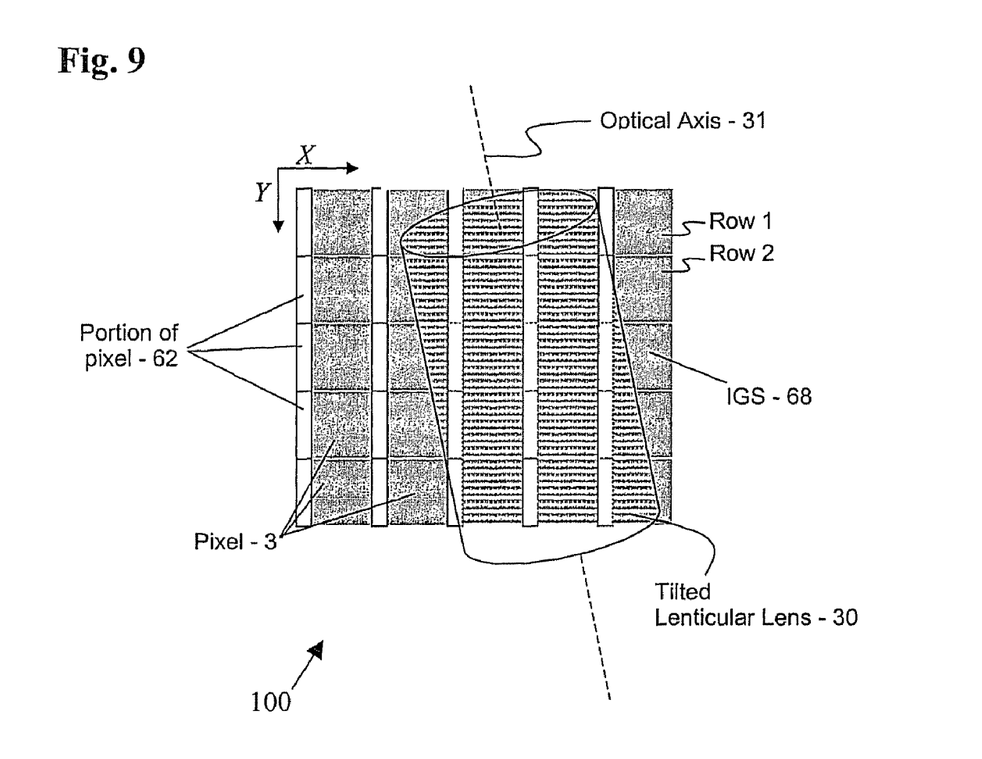
FIG. 9 depicts an embodiment of ray filtering in conjunction with the tilted lenticular lens.

FIG. 9 provides another embodiment of a pixel structure that makes use an IGS 68 having a regular grid of rectangular pixels and a tilted lenticular lens array 30. In this case, a horizontal component of the tilted lenticular lens array 30 includes the desired ray information.

Figure 10:
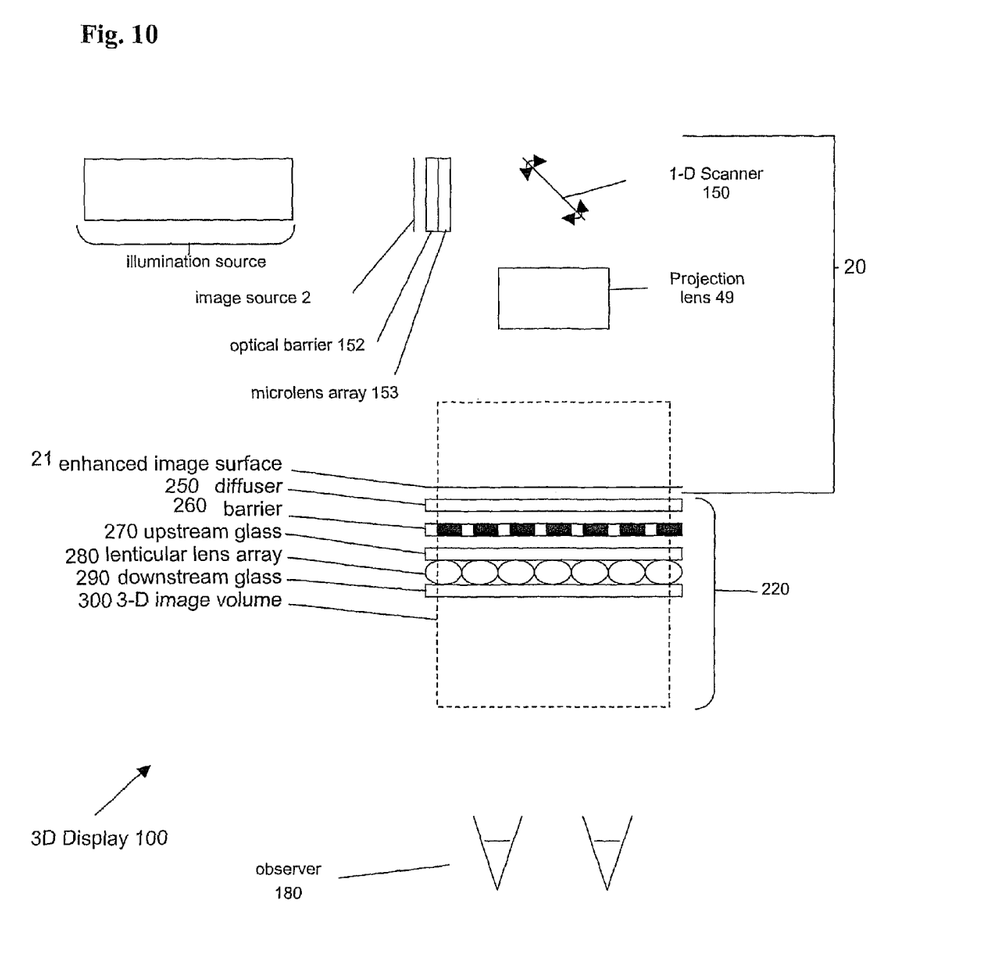
FIG. 10 depicts an embodiment of a 3D display.

FIG. 10 illustrates another embodiment of the 3D display 100. In FIG. 10, the 3D display 100 includes an enhanced-resolution 2D display 20 and 3D image projection optics 220. 3D imagery is projected into a volume approximately indicated by a 3D image volume 300 and is visible by an observer 180 across a horizontal field of view (wherein, the field of view is a function of the 3D image projection optics 220).

The 3D image projection optics 220 include a diffuser 250 that scatters the illumination from an enhanced image surface 21 (i.e., the pixels 3) to an inter-view barrier 260. The inter-view barrier 260 (i.e., the mask 60) passes modulated light to a lenticular lens array 280 that is mounted between an upstream glass plate 270 and a downstream glass plate 290. The lenticular array can be any of a number of well-known lenticular arrays, or can be replaced with an optical element that serves the purpose of optically demultiplexing pixels 3 at the enhanced image surface 21 to a variety of ray trajectories toward one or more observers. Alternatives to the lenticular lens array 280 include a parallax barrier array, a multi-element holographic optical element, and a fly's-eye lens array (for full-parallax 3D images), or other arrays as discussed herein.

One of the simplest methods for producing source imagery with the desired pixel structure is to manufacture an image source 2 (in the case of dynamic imagery) or printing process which inherently uses the desired structure to present the imagery. However, most conventional printing processes and image sources 2 are manufactured with a regular pixel grid. Therefore, an efficient technique for producing the desired pixel structure includes using the light blocking mask 60 with a desired pattern over the image source 2, where the image source 2 uses a regular pixel grid. For manufacturing simplicity, a simple barrier pattern can be used to nearly approximate the desired pixel structure. When a barrier is used as the mask pattern, it is also possible to change the configuration such that the barrier is aligned to the pixel grid, and the lenticular lenses are tilted with respect to the barrier and grid.

In support of the teachings herein, various analysis components may be used, including digital and/or an analog systems. The system may have components such as a processor, storage media, memory, input, output, communications link (wired, wireless, optical or other), user interfaces, software programs, signal processors (digital or analog) and other such components to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus comprising:
    a lenticular lens array; and
    a mask comprising apertures that correspond to respective pixels of a two-dimensional image, wherein:
    the apertures are tilted to substantially correspond to a degree of tilt of the lenticular lens array with respect to a y-axis of a pixel array comprising the respective pixels, and
    the apertures are configured to provide openings for the respective pixels resulting in filtered rays and direct the filtered rays to the lenticular lens array resulting in a three-dimensional image.

2. The apparatus of claim 1, further comprising an image source.

3. The apparatus of claim 2, wherein the image source comprises at least one of a liquid crystal display, a cathode ray tube, a vacuum fluorescent display, a digital light processing display, a plasma display panel, a light-emitting diode, an organic light-emitting diode, a surface-conduction electron-emitter display, a field emission display, or a liquid crystal on silicon display.

4. The apparatus of claim 1, wherein a pattern of the filtered rays is selected to control horizontal resolution and vertical resolution in the three-dimensional image.

5. The apparatus of claim 1, wherein the diagonally staggered apertures are narrower than the respective pixels.

6. The apparatus of claim 5, wherein a width of the apertures relative to a width of the respective pixels is a function of at least one of a number of ray directions to be reconstructed or a resolution density along an x-axis of the pixel array and the y-axis of the pixel array.

7. The apparatus of claim 1, wherein the mask comprises at least one of a one-dimensional barrier or a two-dimensional barrier.

8. The apparatus of claim 1, wherein an optical axis of the lenticular lens array is one of substantially parallel to the y-axis or tilted with respect to the y-axis.

9. The apparatus of claim 1, wherein the lenticular lens array comprises at least one of cylindrical lenses or elliptical lenses.

10. The apparatus of claim 1, further comprising at least one of a diffuser, an upstream plate, or a downstream plate.

11. The apparatus of claim 1, further comprising a scanner.

12. A method comprising:
    generating a two-dimensional image by an image source comprising a pixel array; and
    filtering rays of the two-dimensional image using a mask comprising an array of apertures corresponding to respective pixels of the pixel array yielding filtered rays, the apertures being tilted to substantially match an angle of tilt of at least one lenticular lens relative to the image source; and
    providing the filtered rays to the at least one lenticular lens yielding a three-dimensional image.

13. The method of claim 12, wherein the filtering the rays includes filtering the rays using the mask comprising the array of apertures that are narrower than the respective pixels.

14. A computer-readable medium having stored thereon computer executable instructions that, in response to execution, cause a computer system to perform operations, comprising:
generating a two-dimensional image; and
providing filtered rays derived from the two-dimensional image to one or more lenticular lenses for modulating the filtered rays into a three-dimensional image,
wherein the providing the filtered rays includes passing input rays from the two-dimensional image through a mask comprising apertures corresponding to respective pixels of the two-dimensional image and tilted to substantially match a degree of tilt of the one or more lenticular lenses relative to a source of the two-dimensional image to generate the filtered rays.

15. A system comprising:
means for generating a two-dimensional image; and
means for filtering rays of the two-dimensional image using an array of apertures corresponding to respective pixels of the two-dimensional image to output filtered rays and direct the filtered rays to one or more lenticular lenses to generate a three-dimensional image,
wherein the apertures are tilted to substantially match an angle of tilt of the one or more lenticular lenses relative to the means for generating.

* * * * *

UNITED STATES PATENT AND TRADEMARK OFFICE
CERTIFICATE OF CORRECTION

| | | |
|---|---|---|
| PATENT NO. | : 8,345,087 B2 | |
| APPLICATION NO. | : 11/679539 | |
| DATED | : January 1, 2013 | |
| INVENTOR(S) | : Cossairt | |

It is certified that error appears in the above-identified patent and that said Letters Patent is hereby corrected as shown below:

On the Title Page, in the Figure, for Tag "68", in Line 1, delete "System" and insert -- SubSystem --, therefor.

On the Title Page, in Item (56), under "OTHER PUBLICATIONS", in Column 2, Line 2, delete "inStereoscopic" and insert -- in Stereoscopic --, therefor.

In the Drawings:

In Fig. 5, Sheet 5 of 8, for Tag "68", in Line 1, delete "System" and insert -- SubSystem --, therefor.

In the drawings, Figs. 5, 7A & 7B should be replaced with the corrected Figs. 5, 7A & 7B as shown on the attached page.

In the Specifications:

In Column 3, Lines 66-67, delete "a image generation system" and insert -- an image generation subsystem --, therefor.

In Column 5, Line 22, delete "2D" and insert -- 3D --, therefor.

In Column 5, Lines 60-61, delete "called for to apply" and insert -- called to apply --, therefor.

In Column 6, Line 10, delete "banier" and insert -- barrier --, therefor.

In the Claims:

In Column 8, Lines 38-39, in Claim 5, after " wherein the", delete "diagonally staggered".

Signed and Sealed this
Sixth Day of August, 2013

Teresa Stanek Rea
*Acting Director of the United States Patent and Trademark Office*